June 14, 1955  S. COLEMAN  2,710,660

BATTERY HOLD-DOWN FRAME OF SYNTHETIC RUBBER RESIN MATERIAL

Filed Dec. 10, 1951

INVENTOR.
Sidney Coleman
BY Sigmund Herzog
Attorney.

United States Patent Office 2,710,660
Patented June 14, 1955

2,710,660

BATTERY HOLD-DOWN FRAME OF SYNTHETIC RUBBER RESIN MATERIAL

Sidney Coleman, Maynard, Mass., assignor to Van Brode Milling Co., Inc., Clinton, Mass., a corporation of Massachusetts Application December 10, 1951, Serial No. 260,824

4 Claims. (Cl. 180—68.5)

The present invention relates to improvements in battery hold-down devices, and more particularly to the type which fits and binds storage batteries, such as are used in automobiles, motor boats and the like, in position on their supports.

The hold-down devices now in use are generally in the form of rectangular metallic frames, fitting the battery boxes and having portions which bear against the tops of the batteries, said tops extending a short distance above their battery boxes. Inasmuch as these tops are normally made of plastic materials, which are not especially treated to properly withstand the clamping pressure applied thereto by the hold-down frames, it very frequently happens that the corners of the battery box tops are cracked, whereby the efficiency of the batteries are greatly impaired.

The main object of the present invention is to provide a hold-down frame made of a material strong enough to resist deformation under tension of the bolts by means of which the hold-down frame is clamped against the battery top, and possessing sufficient resiliency effectively to prevent cracking of the battery top.

Another object of the invention is the provision of a battery hold-down device which is made of a material that has good electrical insulating properties and is, thus, especially suited for use in connection with electrical batteries.

A further aim of the invention is to obtain a hold-down device of the character mentioned which has a relatively high heat resistance, and which is non-corrodible, being thus able to withstand deformation by the heat of the engine, near which it is, of necessity, located, and not being subject to attack by the electrolyte of the battery.

Still another object of the invention is to provide a battery hold-down device of a material which will not adhere to the battery, thereby permitting convenient removal thereof from the battery.

With these and other objects in view, which will more fully appear as the nature of the invention is better understood, the same consists in the combination, arrangement and construction of the parts hereinafter described, pointed out in the appended claims and illustrated in the accompanying drawings, it being understood that many changes may be made in the size and proportion of the several elements and details of construction within the scope of the appended claims, without departing from the spirit or sacrificing any of the advantages of the invention.

One of the many possible embodiments of the invention is illustrated in the accompanying drawings, in which.

Figure 1:
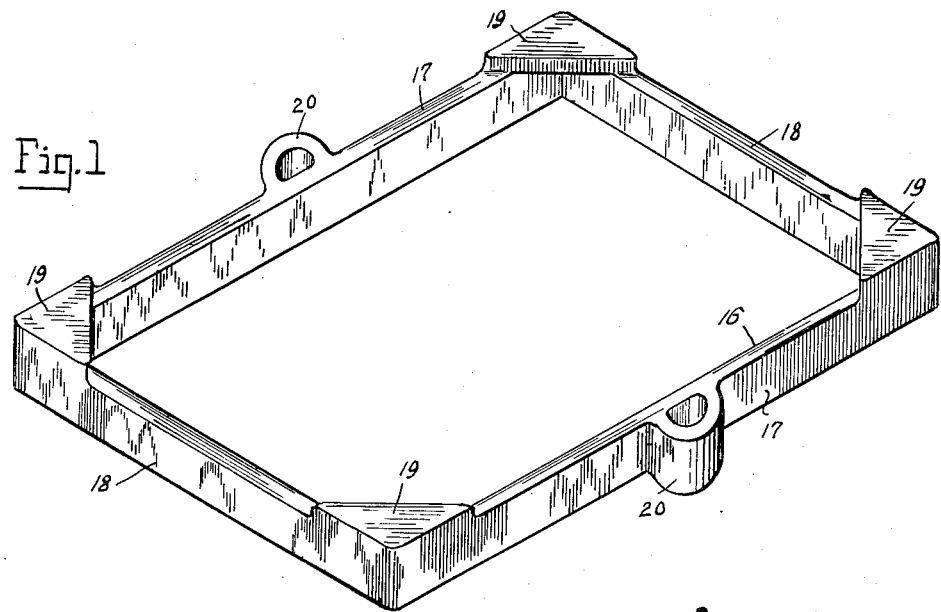
Figure 1 is a perspective view of the improved battery hold-down device.
Figure 2:
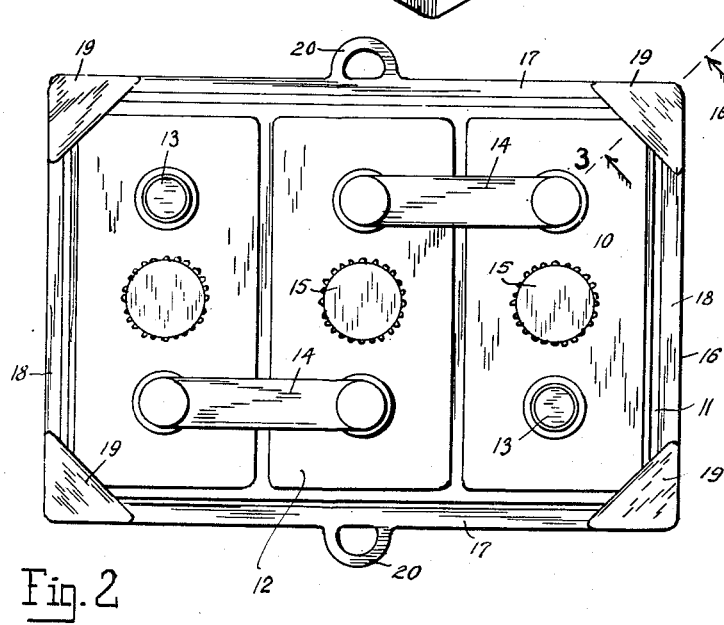
Figure 2 is a top plan view of a storage battery with the hold-down device in position thereon.
Figure 3:
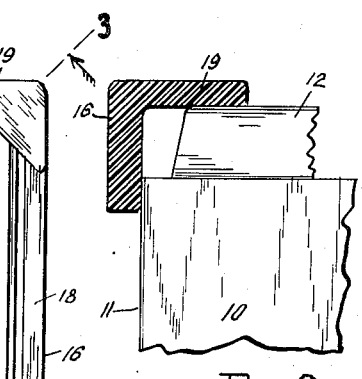
Figure 3 is a section taken on line 3—3 of Figure 2, on a larger scale.

Generally speaking, the frame of the hold-down device is made of a plastic material, such as, for instance, polystyrene, the physical and mechanical properties of which have been changed by the addition of a copolymer and a filler.

Referring now to the drawings, the numeral 10 indicates a storage battery, including a box 11, the top 12 of which extends above said box, as usual in constructions of this type. This top is composed of a plurality of sections, the number of which corresponds to that of the cells of the battery. The numerals 13 denote the battery terminals, the numerals 14 the connectors between terminals of adjacent cells, and the numerals 15 the filler plugs. The construction and operation of the elements thus far described are well known and, therefore, a more detailed description thereof is deemed to be unnecessary. However, it is to be noted that the top sections 12 are molded of plastic material.

The hold-down frame 16 is of open, rectangular shape, complementary to the size and shape of the conventional battery box. It comprises two parallel sides 17, which are connected by parallel ends 18, the sides and ends being adapted to abut against the outer faces of the sides and ends, respectively, of the battery box 10. The corners of the frame are provided with triangular, diagonal clamping members 19, which extend a substantial distance inwardly from the sides and ends connected thereby. The members 19 overlie the upper faces of the sides 17 and ends 18 of the frame, and are adapted to bear against the exposed faces of the corners of the battery top 12.

On each frame side 17 is formed an apertured lug 20, for the reception of the bolts which serve to press the hold-down frame firmly into contact with the battery top corners, thus holding the battery down against its support, not shown. Obviously, the location of the lugs may be varied according to the requirements, for instance the lugs may be formed on the frame ends 18.

The elements of the hold-down device constitute an integral structure or, in other words, all of the elements thereof are molded to form a one-piece frame.

As stated hereinabove, the frame is made of plastic material such as, for instance, modified polystyrene. Ordinary polystyrene, while it has good electrical properties, has insufficient strength, toughness and flexibility to be employed as a structural material. Moreover, polystyrene has a relatively poor heat resistance and, thus, cannot be used on or in connection with devices which are exposed to even moderately high temperatures, nor can polystyrene be subjected to any load while at an elevated temperature. As a result of these properties, obviously, polystyrene is not adapted for the construction of battery hold-down clamps. According to the present invention, I have discovered that by adding to the polystyrene powder a copolymer, such as "Darex copolymer No. 3," produced by the Dewey & Almy Chemical Company, the molded article has an improved building strength, toughness and flexibility. Also, its resistance to softening by heat is increased. By adding an inorganic filler, such as clay, to the molding mass, a molded article may be obtained which not only has the required strength and toughness but also possesses sufficient elasticity to yield under pressure. Hence, a hold-down frame molded by the use of the modified polystyrene, as herein described, has the required strength and toughness, and its sides, ends and diagonal clamping members possess sufficient elasticity effectively to prevent breakage of the corners of the battery top under pressure which is applied to the frame 16. The copolymer and filler above referred to improve also the heat resistance of the compound, so that it is fit for use in connection with articles exposed to relatively high temperatures. The "Darex copolymer No. 3" above referred to is an elastic type of synthetic rubber resin, made by copolymerizing butadiene and styrene to produce a Buna S with a high styrene content.

It is obvious that, while herein a modified polystyrene has been disclosed as the material used in molding the improved hold-down frame, other plastic materials, both thermoplastic and thermosetting, may be employed, provided they have the mechanical and physical properties of the modified polystyrene above described.

What I claim is:

1. A one-piece open battery hold-down frame formed of plastic material, comprising sides, ends connecting said sides, and diagonal clamping members at the juncture of said sides and ends, said clamping members being disposed above the top faces of said ends and sides, the plastic material of which said frame is formed comprising polystyrene the mechanical and physical properties of which have been modified by the addition of a Buna S with a high styrene content, the latter imparting to the polystyrene improved heat resistance, building strength and toughness sufficient to withstand pressure to which the frame is subjected in its function to hold the battery on its support, and also imparting to the polystyrene enough flexibility to prevent breakage of the battery top against which said diagonal members bear in the holding down operation.

2. A one-piece battery hold-down frame according to claim 1, including an inorganic filler added to the modified polystyrene to increase the elasticity of the compound.

3. A one-piece open battery hold-down frame formed of plastic material and including elements bearing against the sides and top of the battery, the plastic material of which said frame is formed comprising polystyrene the mechanical and physical properties of which have been modified by the addition of a Buna S with a high styrene content, the latter imparting to the polystyrene improved heat resistance, building strength and toughness sufficient to withstand pressure to which the frame is subjected in its function to hold the battery on its support, and also imparting to the polystyrene enough flexibility to prevent breakage of the battery top against which elements of said frame bear in the holding down operation.

4. A one-piece battery hold-down frame according to claim 3, including an inorganic filler added to the modified polystyrene to increase the elasticity of the compound.

References Cited in the file of this patent

UNITED STATES PATENTS

| | | |
|---|---|---|
| 1,677,789 | Mabey | July 17, 1928 |
| 2,360,056 | Heitshu | Oct. 10, 1944 |
| 2,382,428 | Leuvelink | Aug. 14, 1945 |